Feb. 5, 1963  K. A. BRANDENBERG  3,076,477
MULTI-WAY PNEUMATIC VALVE
Filed Nov. 21, 1960  2 Sheets-Sheet 2

INVENTOR
KARL A. BRANDENBERG
BY
Gardner + Zimmerman
ATTORNEYS

United States Patent Office 3,076,477
Patented Feb. 5, 1963

3,076,477
MULTI-WAY PNEUMATIC VALVE
Karl A. Brandenberg, San Leandro, Calif., assignor, by mesne assignments, to Modernair Corporation, Bryan, Ohio, a corporation of Ohio
Filed Nov. 21, 1960, Ser. No. 70,834
8 Claims. (Cl. 137—622)

The present invention relates to valves for use in pneumatic systems and more particularly to a highly reliable and substantially friction-free two position multi-way valve suitable for such applications as controlling a pneumatic drive cylinder.

Pneumatic cylinders or motors of the class having a piston disposed within a cylindrical barrel generally require a control valve for switching the driving air flow between ends of the barrel to reciprocate the piston. In most instances, a two position four-way valve is used for this purpose since each end of the barrel must be vented when the compressed air is directed to the opposite end.

The various forms of valve heretofore used for this purpose typically make use of a sliding element to provide for switching of the air flow and have therefore been subject to certain limitations and malfunctions. A type of valve which has been widely used, for example, is the spool valve in which a cylindrical spool is moved longitudinally between two positions within a cylindrical chamber. The spool is provided with a series of circumferential grooves which connect an air inlet with a first end of the drive cylinder at one position and with the opposite end of the cylinder at the other. To prevent leakage of air, annular seals are disposed around the spool between the grooves.

In the spool valve, as well as in other prior forms of cylinder control valves, the presence of sliding seals introduces considerable friction resistance to operation of the valve. Such friction is of particular disadvantage where the inlet air pressure is relied on to move the spool between positions since such a valve is limited to use with fairly high pressure systems. Owing to the friction, there is a tendency for the spool to fail to complete its full travel between positions particularly where low inlet pressures are used. This form of malfunction results in the inlet air being directly expelled from the valve exhaust.

Further disadvantages of the valves heretofore used to control air cylinders include wearing of the sliding seals and an inability to switch between positions with a very rapid motion. In most such valves, sealing elements do not bear directly against ports so that the closing force on a port does not increase when the valve is used with higher pressure driving air.

The present invention provides a novel valve suitable for controlling pneumatic cylinders and which overcomes the foregoing limitations of the prior forms. The valve has no sliding sealing elements, is virtually friction free, and operates with a rapid snap action so that a complete movement from one position to the other will always occur. The valve is held at the desired position by a positive force and ports are held closed by pneumatic pressure which is proportional to the basic system pressure. Owing to the foregoing features, the valve is highly reliable at a very great range of inlet pressures and may be operated with much lower inlet pressures than spool valves.

In particular, the invention provides for valving action at a series of ports by the use of a series of resilient discs one of which faces each port. Means are provided for exerting pressure against each disc to force it against the port for closing the same and to distend it from the port at the alternate position. Through a unique arrangement of the ports, discs, and further structure, the inlet air is utilized to apply the pressures to the discs, to hold the discs at the selected positions, and to provide for switching of the discs between alternate positions.

It is accordingly an object of this invention to provide a more reliable valve structure for use in pneumatic systems.

It is another object of this invention to provide a substantially friction free two position multi-way valve for pneumatic applications.

It is another object of the invention to provide a bistable two position valve which is pneumatically actuated and pneumatically held at a selected position.

It is another object of this invention to provide a valve suitable for controlling an air cylinder and which is capable of extremely rapid switching between valve positions.

It is another object of the invention to provide a multi-way valve for pneumatic applications in which sealing elements bear directly against valve ports and in which the pressure of said elements against said ports is proportional to the inlet pressure at the valve.

It is a further object of the invention to provide a multi-way pneumatic valve of the class operated by inlet pressure and which is capable of reliable operation in a very low pressure system.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claims.

Figure 1:
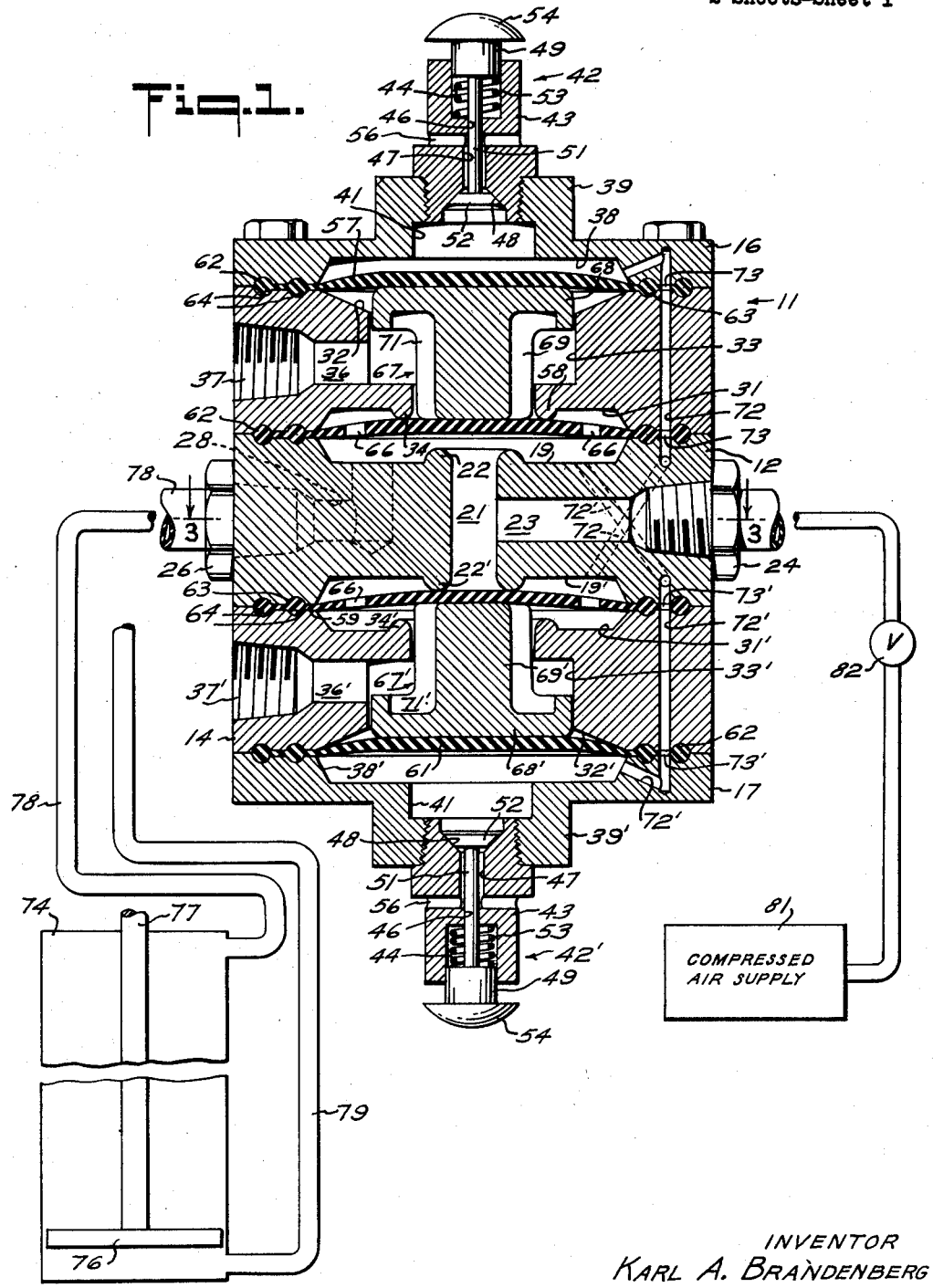
FIGURE 1 is a longitudinal section view of a four-way valve for controlling an air cylinder, the cylinder and air supply means being shown in schematic form.
Figure 2:
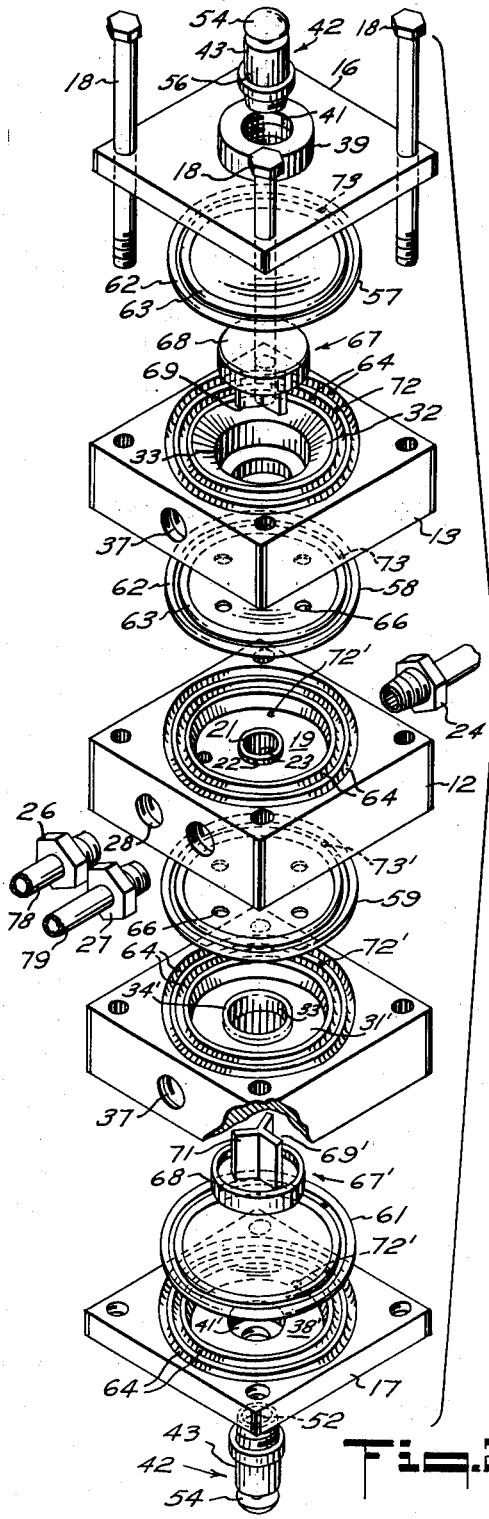
FIGURE 2 is an exploded perspective view further illustrating components of the valve of FIGURE 1.

Referring now to the drawings and more particularly to FIGURES 1 and 2 thereof, a rectangular housing 11 is formed by a center member 12, a pair of intermediate members 13 and 14 disposed against opposite faces of the center member, and a pair of end plates 16 and 17 disposed against members 13 and 14 respectively. The housing members 12, 13, 14, 16 and 17 are secured together by four bolts 18 which extend through each of the members at the corners thereof.

The housing 11 is symmetrical about the central plane of center member 12. Thus the intermediate members 13 and 14 are of identical configuration but face in opposite directions and the end plates 16 and 17 are similarly related. Accordingly, in FIGURE 2, features on the hidden sides of each member 12, 13, 14, 16 and 17 are similar to features shown on the exposed side of the corresponding member.

Considering now the detailed structure of the center member 12, a broad circular concavity 19 is provided on the face thereof which is adjacent member 13 and a similar concavity 19' is formed on the opposite face of the center member. A bore 21 transpierces the center of member 12, connecting the concavities 19 and 19', and axially projecting annular lips 22 and 22' are formed at the mouths of the bore within concavities 19 and 19' respectively. An air inlet passage 23 extends within the center member 12 communicating bore 21 with a fitting 24 at one side of the member.

Figure 3:
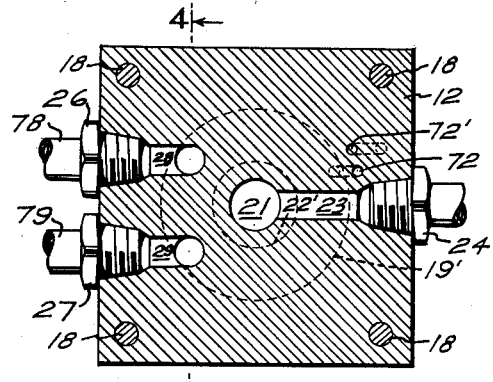
FIGURE 3 is a cross-section view taken along line 3—3 of FIGURE 1 and showing internal passages within the valve.
Figure 4:
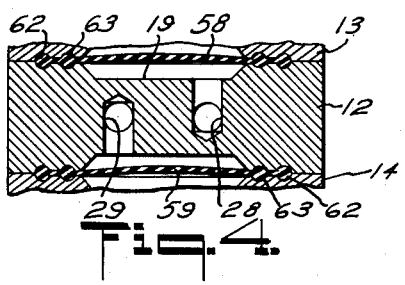
FIGURE 4 is a fragmentary section view of the valve taken along line 4—4 of FIGURE 3 and showing additional internal passages.

Referring now to FIGURE 3, a first outlet fitting 26 and second outlet fitting 27 engage in the center member 12 at the side thereof opposite inlet fitting 24. A passage 28 extends towards the center of member 12 from fitting 26 and a second parallel passage 29 extends from fitting 27. As shown in FIGURE 4, passage 28 is formed to turn ninety degrees and open into concavity 19 while passage 29 turns in the opposite direction and opens into concavity 19'.

Referring now again to FIGURES 1 and 2 in conjunction, intermediate member 13 of the housing 11 is provided with a broad circular concavity 31 facing concavity 19 on center member 12 and of similar diameter. A tapered shallow concavity 32 is formed on the opposite face of intermediate member 13. A stepped bore 33 transpierces the center of member 13, the bore having the narrowest section adjacent concavity 31 and having a slightly projecting annular lip 34 within the concavity. An air exhaust passage 36 connects the broad section of bore 33 with a threaded opening 37 in the side of the member 13.

Intermediate housing member 14 is similar in configuration to member 13 as described above and thus is provided with a broad circular concavity 31' on the face adjacent center member 12 and is further provided with a tapered concavity 32' on the opposite face. A stepped bore 33' transpierces the center of member 14 and an annular raised lip 34' is formed around the mouth of the bore within concavity 31'. An air exhaust passage 36' connects bore 33' with a threaded opening 37' at one side of the member 14.

Considering now the detailed structure of end plate 16, a broad circular concavity 38 is formed in the face of the plate adjacent member 13 which concavity is similar in diameter to concavity 32 of member 13. A circular boss 39 is provided on the outer face of the plate 16 and a stepped bore 41 transpierces the boss and communicates with concavity 38, the narrower outer section of the bore being threaded to receive a bleeder valve 42 which valve will be hereinafter described.

End plate 17 is of similar construction and is thus provided with a concavity 38' facing concavity 32', and a boss 39' on the outer face which boss is transpierced by a stepped bore 41' having a second bleeder valve 42' engaged therein.

The bleeder valves 42 and 42' are utilized to selectively exhaust air from concavities 38 and 38' respectively for purposes of controlling the valve as will hereinafter be described. Accordingly each such valve 42 and 42' comprises a tubular fitting 43 having an axial bore, the bore having an outer section 44, a subsequent section 46 of reduced diameter, a subsequent section 47 of intermediate diameter and an inner section 48 which flares to form a valve seat and communicates with the interior face of the adjacent end plate. A valve stem is slidably disposed in the bore of fitting 43, the stem having an outer section 49 fitting within bore section 44, an intermediate portion 51 extending through bore sections 46 and 47, and a tapered inner extremity 52 which seats against valve seat 48. A compression spring 53 is disposed within bore section 44 to urge stem section 49 outwardly and a button 54 is secured to the extremity of stem section 49. Lateral passages 56 extend from bore section 47 to the sides of fitting 43 so that depression of button 54 acts to open the bleeder valve which is otherwise normally closed.

Considering now the means by which the switching of air flows within housing 11 is accomplished, four resilient circular diaphragms are disposed one between each adjacent pair of housing members. Thus a first diaphragm 57 is disposed between end plate 16 and member 13, a second diaphragm 58 is disposed between member 13 and center member 12, a third diaphragm 59 is disposed between members 12 and 14 and the fourth diaphragm 61 is situated between member 14 and end plate 17.

Each of the diaphragms 57, 58, 59 and 61 is of greater diameter than the concavities on the two adjacent housing members and each is provided with a pair of concentric annular beads around the periphery, the outer beads 62 being of slightly greater diameter than the inner beads 63. The beads 62 and 63 seat in matching annular grooves 64 formed on the adjacent faces of each housing member, which grooves are concentric with the concavities thereon, the beads thus serving to hold the diaphragms in position and to provide an air tight seal between adjacent housing members.

Each of the diaphragms, which may be made of rubber or other suitable elastic material, is formed to have a slightly dished configuration so that it is bistable. Thus the diaphragms will be slightly concave in the rest condition and the application of an axial force will cause them to assume a second position of concavity in the opposite sense but the diaphragms may not remain in a strictly planar position.

To provide continuous communication between housing concavities 31 and 19 and between concavities 31' and 19', the two center diaphragms 58 and 59 are transpierced by circular openings 66 situated a small distance inwardly from the inner beads 63.

To coordinate movement of diaphragm 58 with that of diaphragm 57, a pressure transmitting element 67 is slidably disposed within bore 33 between the two diaphragms. Such element 67 includes a circular cap portion 68 having a diameter conforming to the outer section of bore 33 and a portion 69 of reduced diameter which projects axially from the cap towards diaphragm 58 and which portion has three equiangularly spaced longitudinal grooves 71 providing for the passage of air through bore 33. A similar pressure transmitting element 67' is disposed in bore 33' between diaphragms 59 and 61, the element having a cap portion 68' and axially projecting portion 69' with grooves 71' which provide for the passage of air along the bore 33'.

To supply high pressure air to end plate concavities 38 and 38' respectively, for purposes of controlling motion of the diaphragms, a pair of passages connect the foregoing regions with center member concavities 19' and 19 respectively. A first such passage 72 extends from the peripheral region of concavity 38 through a lateral portion of the end plate 16 and through housing member 13 into the housing center member 12, openings 73 being provided in the diaphragms 57 and 58 to provide for the passage which openings are situated between beads 63 and 64 of the diaphragms. Within center member 12, the passage 72 is angled and opens into concavity 19'. The passage 72 is made very narrow relative to other flow passages within the valve.

A second similar narrow passage 72' extends within end plate 17 and through housing members 14 and 12 to connect end plate concavity 38' with center member concavity 19, openings 73' being provided in diaphragms 59 and 61 for the passage.

Considering now the operation of the valve, and with reference to FIGURE 1 in particular, a conventional pneumatic drive cylinder 74 is shown which cylinder includes a reciprocable piston 76 which may be coupled to a load by means of a drive shaft 77. An air conduit 78 connects a first end of cylinder 74 with the valve outlet fitting 26 and a second air conduit 79 connects the opposite end of the cylinder with the second valve outlet fitting 27. To provide driving air for the cylinder 74, a suitable compressed air supply 81 is connected with the valve inlet fitting 24 preferably through a shut-off valve 82.

For purposes of explaining the operation of the valve, the mechanism will be considered to be initially in the position shown in FIGURE 1, i.e., the diaphragms 57, 58, 59 and 61 are all in the position where their centers are displaced towards end plate 16. It will further be assumed that the shut-off valve 82 has been opened so that compressed air from supply 81 is entering the inlet passage 23 in center member 12.

In the foregoing position of the valve, air from supply 81 is directed to the drive cylinder conduit 78, while cylinder conduit 79 is vented and accordingly the cylinder undergoes a contracting movement. Specifically, the compressed air from supply 81 passes through inlet passage 23 and bore 21 to center member concavity 19. As may be seen by reference to FIGURES 3 and 4, concavity 19 is communicated with the cylinder air conduit 78 through passage 28 and outlet fitting 26. The opposite drive cylinder air conduit 79, however, is communicated with concavity 19' through fitting 27 and passage 29. Referring again to FIGURE 1, the concavity 19' may be seen to be vented to the atmosphere through the openings 66 in diaphragm 59, intermediate member concavity 31', bore 33' and exhaust passage 36'.

An important advantage of the valve of the instant invention is the fact that the diaphragms 57, 58, 59 and 61 are each held in the above described position by a pneumatic pressure. The inlet pressure is transmitted through passage 72' to concavity 38' in end plate 17 where it acts against diaphragm 61 to hold the diaphragm in the above described position. This pressure is in turn transmitted to diaphragm 59 by the element 67' so that the latter diaphragm is also held in the described position. While the inlet pressure acts in the opposite direction against diaphragm 59 at the mouth 22' of bore 21, the area of the bore is less than that of end plate concavity 38' so that the net force on the diaphragms 59 and 61 is in the desired direction.

The remaining two diaphragms 57 and 58 are also held in the described position by the inlet pressure acting against diaphragm 58 within center member concavity 19, the element 67 acting to transmit such pressure to diaphragm 57. No opposing pressure is exerted on the diaphragms 57 and 58 inasmuch as the concavity 38 in end plate 16 is vented to the atmosphere through passage 72, concavity 19', openings 66 in diaphragm 59, concavity 31', bore 33' and exhaust passage 36'.

As a further important feature of the invention, it will be noted that the ports within the valve which must be sealed in the described position of the valve, e.g., mouth 34 of bore 33 in housing member 13 and mouth 22' of bore 21 in center member 12, are sealed by the direct pressure of a rubber diaphragm thereon and that such pressure is proportional to the basic system pressure provided from air supply 81.

To switch the valve to the alternate position, and thus to initiate an expansion stroke of the drive cylinder 74, button 54' of bleeder valve 42' is momentarily depressed. Opening of the bleeder valve 42' in this manner temporarily vents concavity 38' in end plate 17 thereby removing the pneumatic pressure against diaphragm 61. The inlet pressure acting against diaphragm 59 at mouth 22' of center member bore 21 is therefore enabled to force diaphragm 59 away from the bore mouth 22' and, through the action of element 67', to force diaphragm 61 in a similar direction.

The remaining diaphragms 57 and 58 also immediately reverse their positions. This occurs since the above described movement of diaphragm 59 acts to supply inlet pressure to concavity 36 in end member 16 through passage 72. Such pressure acts against diaphragm 57 over a much greater area than the counter pressure acting against diaphragm 58 at mouth 34 of bore 33 of housing member 13. Accordingly, diaphragm 57 is forced away from end plate 16 and such movement is transmitted to diaphragm 58 by the element 67.

When, owing to the foregoing movement, diaphragm 58 has contacted mouth 22 of bore 21 in the center member 12, the valve inlet pressure is cut off from concavity 38' in end plate 17. Such concavity 38' is now vented to the atmosphere through passage 72', concavity 19, openings 66 in diaphragm 58, concavity 31, bore 33 and exhaust passage 36. Accordingly the subsequent release of button 54' of bleeder valve 42' will have no effect on the system as concavity 38' remains vented to the atmosphere through the foregoing passages.

It may now be seen that the valve has assumed the reverse position from that first described and that compressed air from source 81 is now supplied drive cylinder air conduit 79 while the opposite cylinder conduit 78 is vented to the atmosphere. Specifically, and with reference to FIGURES 3 and 4, air inlet passage 23 is communicated with drive cylinder conduit 79 through bore 21, concavity 19', passage 29 and fitting 27. At the same time, the drive cylinder conduit 78 is vented through fitting 26, passage 28, concavity 19, openings 66 of diaphragm 58, concavity 31, bore 33 and exhaust passage 36.

In the second position of the valve, pneumatic force is again present to hold the valve in position, the action being similar to that previously described but operative in a reverse direction. Accordingly, the valve must remain in the second position until it is returned to the first by momentary depression of button 54 of bleeder valve 42. Upon depression of button 54 the valve returns to the first position through a sequence of movements similar to that described above but acting in a reverse direction.

Figure 5:
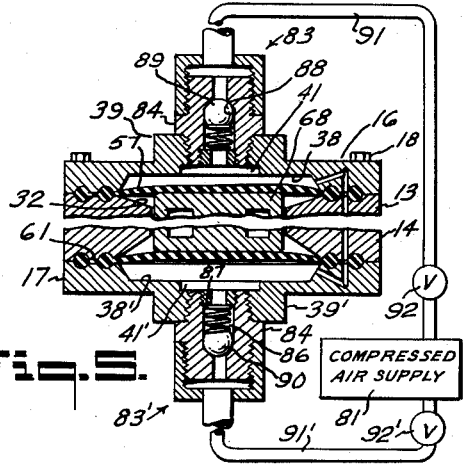
FIGURE 5 is a partial longitudinal section view corresponding to FIGURE 1 and showing an alternate mechanism for controlling the valve.

The valve may be controlled by means other than the bleeder valves described above. Referring now to FIGURE 5, an example of another form of control mechanism is shown. In FIGURE 5, all elements of the valve are similar to those shown in FIGURE 1 except that the bleeder valves thereof have been replaced with check valves, a first such check valve 83 being threadably engaged in bore 41 of end plate 16 and a second check valve 83' being engaged in bore 41' of end plate 17.

Each of the check valves 83 and 83' comprises a tubular body 84 having an axial passage 86 which is enlarged within the body to form a shelf 87 at the lower end and a valve seat 88 at the upper end. A sphere 89 is disposed within the enlarged section of passage 86 which sphere is urged towards the valve seat 88 by a compression spring 90 also disposed in the enlarged section of the passage.

The check valves 83 and 83' allow the pneumatic valve to be controlled by pilot pressure impulses. An impulse of high pressure air delivered to check valve 83 will force the adjacent diaphragm 57 away from the check valve and thus initiate the sequence of movements hereinbefore described by which the invention is caused to switch between positions. The narrow cross-section of passage 72 allows the high pressure impulse to act for a sufficient period to effect this movement. A subsequent impulse of high speed air delivered to check valve 83' will return the invention to the first position by a similar but opposite action. A representative means for supplying such impulses might comprise a conduit 91 connecting check valve 83 with the air supply 81 through a valve 92 and a second conduit 91' connecting the supply with check valve 83' through a second valve 92'. Momentary opening of either of the valves 92 or 92' will thus serve to produce the desired impulses. It should be understood, however, that the system shown is but one example of a means for delivering effective pressure impulses to the check valves 83 and 83' and that in practice such impulses may come from any of various control points in a complex pneumatic circuit.

While the invention has been herein described with reference to use in controlling a pneumatic drive cylinder, it will be apparent to those skilled in the art that the invention has general application for other purposes which require a multi-way valving action.

What is claimed is:

1. In a pneumatic valve, the combination comprising a housing having a first and a second cavity therein each of said cavities having a first port on one side thereof and a second port on the opposing side thereof, said housing having a high pressure inlet communicating said first ports of said first and second cavities and having a first outlet communicating with said first cavity and second outlet communicating with said second cavity, said first and second outlets independent of said high pressure inlet, said housing also having a third and a fourth cavity and passages independent of said high pressure inlet connecting said first cavity with a first side of said fourth cavity and connecting said second cavity with a first side of said third cavity, said housing further having a third outlet communicating with said second port of said first cavity and the second side of said third cavity and having a fourth outlet communicating with said second port of said second cavity and with the second side of said fourth cavity, said third and fourth outlets independent of said first and second outlets and said passages and said inlet, a first and a second sealing member disposed in said first and second cavities respectively between the opposed ports thereof, a third and a fourth sealing member disposed in said third and fourth cavities respectively and separating said first and second sides thereof, means for transmitting movement of said third sealing member to said first sealing member and for transmitting movement of said fourth sealing member to said second sealing member, and means for momentarily altering the pressure at said first sides of a selected one of said third and said fourth cavities to initiate movement of said sealing members within said valve.

2. A pneumatic valve as described in claim 1 wherein said means for momentarily altering the pressure at said first side of a selected one of said third and fourth cavities comprises a pair of normally closed bleed valves one operative on said third cavity and one operative on said fourth cavity, each of said bleed valves venting the associated cavity upon opening of said bleed valve.

3. A pneumatic valve as described in claim 1 wherein said means for momentarily altering the pressure at said first side of a selected one of said third and fourth cavities comprises a pair of check valves one communicating with each of said third and fourth cavities and limiting flow to a direction toward the associated cavity, said check valves each having provision for connection with a remote source of high pressure impulses.

4. A four-way pneumatic valve comprising, in combination, a housing having four shallow flat parallel cavities therein and having a bore inter-connecting each of said cavities which bore has a section of enlarged diameter adjacent to each of the outermost of said cavities, said housing having a high pressure inlet communicating with said bore between the two innermost of said cavities and having a first pair of outlets each communicating with a separate one of said two innermost cavities, said housing further having a pair of exhaust passages each communicating with a separate one of said enlarged sections of said bore, said housing also having an additional pair of narrow passages each communicating the outer side of a separate one of said outermost cavities with the most remote one of said innermost cavities, four elastic diaphragms secured in said housing one in each of said cavities and in transverse relationship to said bore, the two outermost of said diaphragms forming gas-tight barriers across the associated cavity and the two innermost of said diaphragms providing for flow between opposite sides of the associated cavity, a pair of movable elements disposed in said bore each being between a separate outermost and innermost one of said diaphragms to provide for concurrent movement thereof, and means for momentarily altering the pressure in a selected one of said outermost cavities at the outer sides of said barriers therein.

5. A four-way pneumatic valve as described in claim 4 wherein said housing is formed by five flat members secured together in stacked relationship, said members each having shallow concavities on the juxtaposed faces whereby adjacent pairs of said concavities form said four cavities within said housing.

6. A four-way pneumatic valve as described in claim 4 wherein said housing is formed by five flat members secured together in stacked relationship, said members having shallow concavities on the juxtaposed faces thereof to define said four cavities and wherein said diaphragms are of greater diameter than said cavities and the margins of said diaphragms extend between said juxtaposed faces to form a gas-tight seal between said members of said housing.

7. A four-way pneumatic valve comprising, in combination, a housing having four shallow flat parallel cavities therein and having a bore inter-connecting each of said cavities which bore has an outer section adjacent to each of the outermost of said cavities, said housing having a high pressure inlet communicating with said bore between the two innermost of said cavities and having a first pair of outlets each communicating with a separate one of said two innermost cavities, said housing further having a pair of exhaust passages each communicating with a separate one of said outer sections of said bore, said housing also having an additional pair of narrow passages independent of each other and each communicating the outer side of a separate one of said outermost cavities with the inner side of the most remote one of said innermost cavities, four movable sealing members mounted in said housing one in each of said cavities and in transverse relationship to said bore, the two outermost of said members forming gas-tight barriers across the associated respective outermost cavities and the two innermost of said members providing for flow between opposite sides of the associated respective innermost cavities, movable elements associated with the sealing members and said bore each being interposed between an outermost and adjacent innermost members, to provide for concurrent movement thereof, and means for momentarily altering the pressure in a selected one of said outermost cavities at the outer sides of said barriers therein.

8. In a pneumatic valve, a housing having complementary operating sections, a high pressure inlet operatively interposed between said sections, a pair of outlet passages each arranged to alternately serve for the outlet or return of air, each of said sections including an exhaust passage and cavity in communication with said inlet and said exhaust passage and with one of said outlet passages, each of said sections including a second cavity spaced from the first cavity of the section, and a bridging passage connecting the said first cavity of each of said sections with the said second cavity of the other section; a sealing member mounted for movement in the first cavity of each of said sections operative in one position to close communication between said inlet and the one outlet and exhaust passages of said section, while affording communication between said bridging passage and said one outlet and exhaust passages of said section, said sealing member being operable in another position to afford communication between said inlet and said outlet and bridging passages of said section while preventing communication between said exhaust passage and said inlet, outlet and bridging passages; a second sealing member mounted for movement in said second cavity of each section and operative to move the first sealing member thereof from the second to the first position or for the return of same to the second position, each of said bridging passages leading to the associated second cavity on the side of the second sealing member therein, such that when the bridging passage is in communication with the inlet the inlet pressure will be exerted to move the second sealing member in a direction moving the first sealing member to the first position; and means to relieve the pressure over the second sealing member of each section.

References Cited in the file of this patent

UNITED STATES PATENTS

| | | | |
|---|---|---|---|
| 2,376,918 | Hughes | May 29, | 1945 |
| 2,911,005 | Adelson | Nov. 3, | 1959 |
| 2,912,006 | Cooksley | Nov. 10, | 1959 |
| 2,984,257 | McCormick et al. | May 16, | 1961 |